United States Patent [19]

Gao

[11] Patent Number: 5,050,550
[45] Date of Patent: Sep. 24, 1991

[54] HYBRID STEP COMBUSTION SYSTEM

[76] Inventor: Litang Gao, #32, Door 3, 439 Building, Chuangye Street, Changchun, Jilin Province, China, 130011

[21] Appl. No.: 551,157

[22] Filed: Jul. 11, 1990

[51] Int. Cl.$^5$ .................... F02B 19/10; F02M 43/00
[52] U.S. Cl. .................................. 123/275; 123/304; 123/431
[58] Field of Search ............... 123/27 GE, 274, 275, 123/276, 277, 279, 295, 301, 304, 430, 431, 525, 526

[56] References Cited

U.S. PATENT DOCUMENTS

| | | | |
|---|---|---|---|
| 1,858,824 | 5/1932 | Heidelberg | 123/27 GE |
| 2,534,346 | 12/1950 | Fenney | 123/431 |
| 3,916,840 | 11/1975 | Geiger | 123/277 X |
| 3,999,532 | 12/1976 | Kornhauser | 123/276 X |
| 4,071,013 | 1/1978 | Thuren et al. | 123/277 |
| 4,075,996 | 2/1978 | Hisserich | 123/275 |
| 4,603,674 | 8/1986 | Tanaka | 123/27 GE X |
| 4,817,568 | 4/1989 | Bedford | 123/27 GE X |

FOREIGN PATENT DOCUMENTS 467818  6/1937  United Kingdom ............... 123/275

Primary Examiner—Tony M. Argenbright

[57]     ABSTRACT

Hybrid step combustion system (HYSCOM) is available for four-stroke and two-stroke internal combustion engines. HYSCOM uses diesel and gasoline as fuels in operation. HYSCOM has a main combustion chamber and a prechamber in the separate combustion chamber structure or has only a main combustion chamber in the single region combustion chamber structure. HYSCOM includes one gasoline injector disposed in the intake manifold port and one diesel injector disposed in the prechamber in the separate combustion structure or disposed in the main combustion chamber in the single region combustion chamber structure. HYSCOM has two combustion modes. In the single fuel combustion mode, only air charge is introduced into the cylinder in the intake stroke. Near the end of compression stroke, a diesel injector supplies diesel fuel into the high temperature and pressure air charge in the combination chamber where it ignites. In the dual fuel combustion mode gasoline injector supplies gasoline fuel into the air charge in the intake manifold port and then is introduced into the cylinder with the air charge together in the intake stroke. Near the end of the compression stroke, there is premixed gasoline mixture in the combustion chamber whose temperature and pressure are high enough to make injected diesel fuel ignite immediately. A diesel injector supplies diesel fuel into the premixed gasoline mixture where it ignites. The diesel flame then ignites the premixed gasoline mixture.

11 Claims, 7 Drawing Sheets

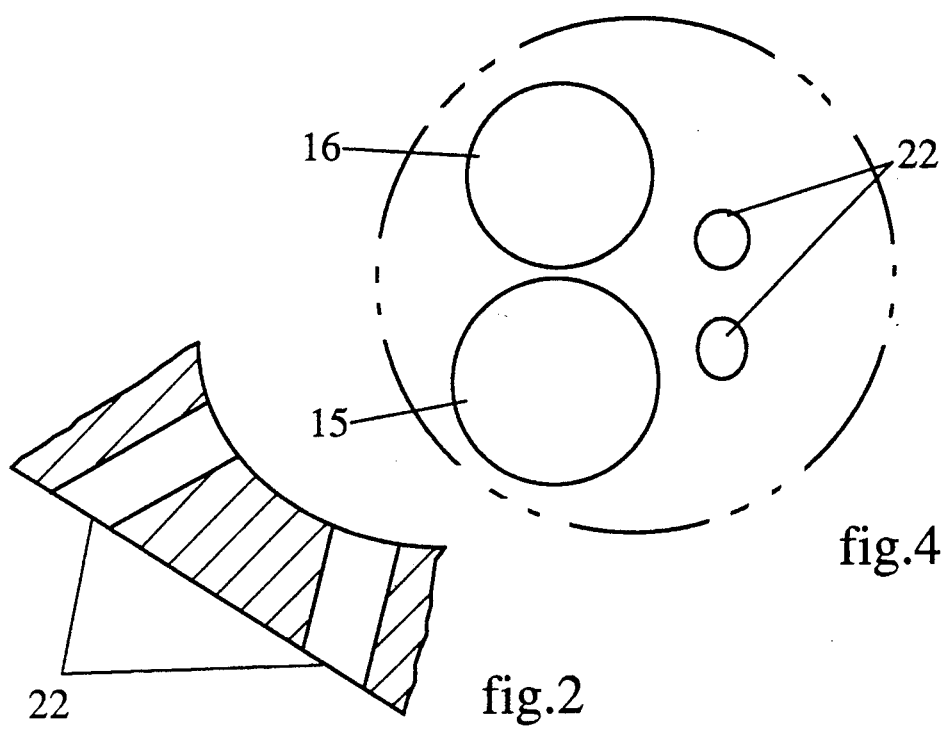
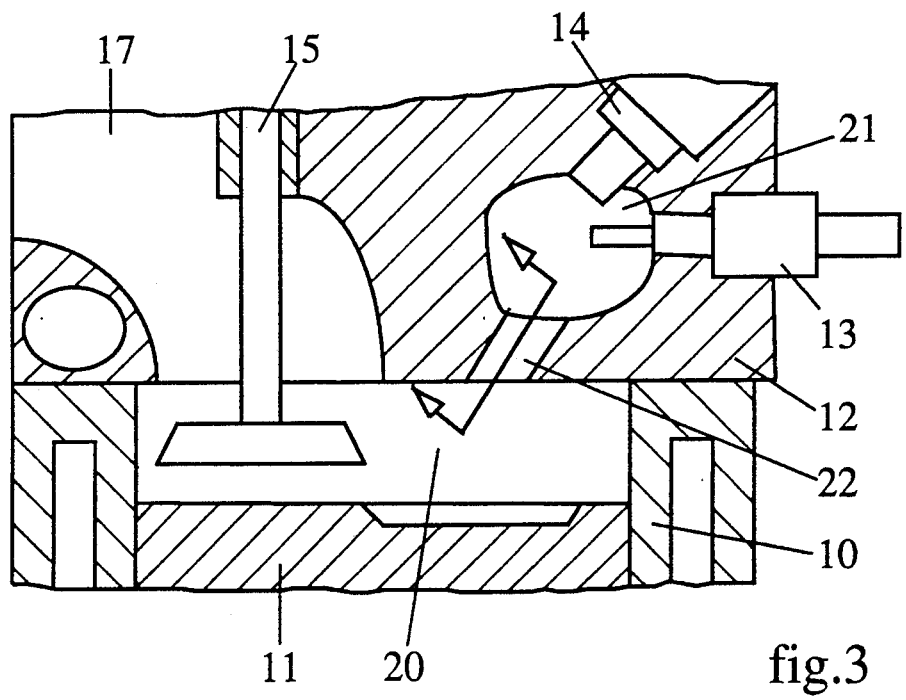

HYBRID STEP COMBUSTION SYSTEM

BACKGROUND

The present patent application relates to internal combustion engines and more particularly to the combustion system of internal combustion engines presenting a new manner of organizing and performing the combustion.

Usually diesel engines have low fuel comsumption and low emissions, but have disadvantages of smoke and roughness which are two main problems on which researchers have been focused. Gasoline engines have high fuel consumption and high emissions. But gasoline engines run smoothly, are easy to cold start and usually have no smoke. The differences come from the different properties of diesel fuel and gasoline fuel, from the different combustion methods and design factors of diesel engines and gasoline engines.

Diesel fuel is easily-self-ignited, not-easily-vaporized, and self-lubricating. As a response to not-easily-vaporized and self-lubricating properties of diesel fuel, diesel engines inject diesel fuel into the high temperature and high pressure air charge in the cylinder near the end of the compression stroke. Injected diesel fuel undergoes physical and chemical changes and ignites itself. And then the combustion of diesel fuel carries out mainly in the manner of diffusing-combustion. Just according to the self-lubricating property of diesel fuel, diesel engines can use high pressure injection to inject diesel fuel near the end of the compression stroke to get good mixing of diesel fuel and air. In order to ignite diesel fuel by high temperature and high pressure, diesel engines use high compression ratio. Diesel engines use diffusing-combustion, therein diesel engines employ fuel-adjust-load and have a large air/fuel ratio. High compression ratio, large air/fuel ratio and fuel-adjust-load make diesel engines have low fuel consumption and low emissions. But diffusing-combustion leads easily to smoke. Diesel engines have poor mixing of diesel fuel and air compared to gasoline engines. Generally speaking, reducing smoke is contrary to reducing running rough. To solve these two problems simultaneously is difficult to do. In fact, today's diesel engines are too rough and too smoky compared with gasoline engines.

The properties of gasoline are it is volatile, not-easily-self-ignited, and not-self-lubricating. Using the property of volatility, conventional gasoline engines supply gasoline fuel into the intake air charge in the intake manifold and use a spark plug instead of high temperature and pressure to ignite the mixture. Also because of the not-self-lubricating property, gasoline engines rarely use high pressure injection in concern about manufacturing and running cost. Gasoline engines have to use low compression ratio and rich mixture compared with diesel engines under the limits of the mixture of gasoline fuel and air. Low compression ratio and rich mixture lead to high fuel consumption and high emissions. Using a throttle to adjust intake charge in order to keep suitable air/fuel ratio also leads to power loss and high fuel consumption. But conventional gasoline engines use a better mixture than that of diesel engines. The method of flame-spreading combustion in the homogeneous mixture gets the benefits of smoothness and no smoke of gasoline engines.

In response to the properties of diesel fuel and gasoline fuel, considering the advantages and disadvantages of diesel combustion system and gasoline combustion system, to combine the properties of diesel fuel and gasoline fuel to develop new combustion system is a important approach to achieve low fuel consumption and low emissions.

SUMMARY OF THE INVENTION

Hybrid step combustion system (HYSCOM) is available for four-stroke and two-stroke engines. HYSCOM uses diesel and gasoline as fuels in operation and employes fuel-adjust-load method to regulate power output of the engine. HYSCOM is a general combustion system which can be used in the separate combustion chamber structure and the single region combustion chamber structure.

The combustion chamber of HYSCOM has a main combustion chamber and a prechamber which are interconnected by flame holes in the separate combustion chamber structure or has only a main combustion chamber in the single region combustion chamber structure. HYSCOM has no throttle to adjust intake charge. An intake valve(s) disposed in the main combustion chamber interconnects the main combustion chamber with the intake manifold port. An exhaust valve(s) disposed in the main combustion chamber interconnects the main combustion chamber with the exhaust manifold port. The piston of the engine of HYSCOM has a cavity in the piston head either in the separate combustion chamber structure or in the single region combustion chamber structure. HYSCOM has one gasoline injector disposed in the intake manifold port and one diesel injector disposed in the prechamber in the separate combustion chamber structure or disposed in the main combustion chamber in the single region combustion chamber structure. HYSCOM also includes a glow plug to aid cold start in the separate combustion chamber structure.

HYSCOM has two combustion modes: single fuel combustion mode and dual fuel combustion mode. When HYSCOM's engine runs in idle or low load running condition, in the intake stroke, only air charge is introduced into the cylinder and gasoline injector does not supply any gasoline fuel. As the compression stroke continues, the temperature and pressure in the cylinder increase. Near the end of the compression stroke, the temperature and pressure are high enough to vaporize and ignite injected diesel fuel immediately. Diesel injector supplies diesel fuel into the prechamber in the separate combustion chamber structure. Injected diesel fuel ignites and then the flame with diesel mixture and burned products rushes out of the prechamber through the flame holes into the main combustion chamber. Then the combustion is completed in the main combustion chamber and in the prechamber. In the single region combustion chamber structure, diesel injector supplies diesel fuel into the main combustion chamber. Injected diesel fuel ignites, and then the combustion is completed in the main combustion chamber.

When HYSCOM's engine runs in large or full load running condition, a gasoline injector supplies gasoline fuel into the air charge in the intake manifold port. Injected gasoline fuel vaporizes and mixes with the air charge. And then the mixture is introduced into the cylinder in the intake stroke. As the compression stroke continues, the pressure and temperature of the mixture in the cylinder get high enough to make injected diesel fuel ignite immediately at the time for injecting diesel fuel. At this time, in the main combustion chamber and the prechamber, there is a premixed lean mixture of gasoline and air. Diesel injector supplies diesel fuel into the prechamber in the separate combustion chamber structure. Injected diesel fuel ignites and the diesel flame ignites the premixed gasoline mixture in the prechamber. As the pressure and temperature increase, the flame diesel mixture, gasoline mixture and burned products rush out of the prechamber through the flame holes. The premixed gasoline mixture in the main combustion chamber is ignited by the flame coming from the prechamber. Then the flame spreads through in the premixed gasoline mixture in the main combustion chamber until the combustion is completed. In the single region combustion chamber structure, a diesel injector supplies diesel fuel into the main combustion chamber. Injected diesel fuel ignites and the diesel flame ignites the premixed gasoline mixture. The flame spreads through the premixed gasoline mixture until the combustion is completed in the main combustion chamber.

BRIEF DESCRIPTION OF DRAWINGS

The above-mentioned and other features and objects of this invention and the manner of obtaining them will become more apparent and the invention itself will be better understood by reference to the following description of an embodiment of the invention taken in conjunction with the accompanying drawings wherein:

FIG. 2 is a schematic section view of the flame holes in the separate combustion chamber structure.

FIG. 3 is an assembly schematic section view of the separate combustion chamber structure.

FIG. 4 is a schematic view of a portion of the cylinder head of the engine of HYSCOM in the separate combustion chamber structure showing the positions of the intake valve, the exhaust valve and the flame holes.

Figure 1:
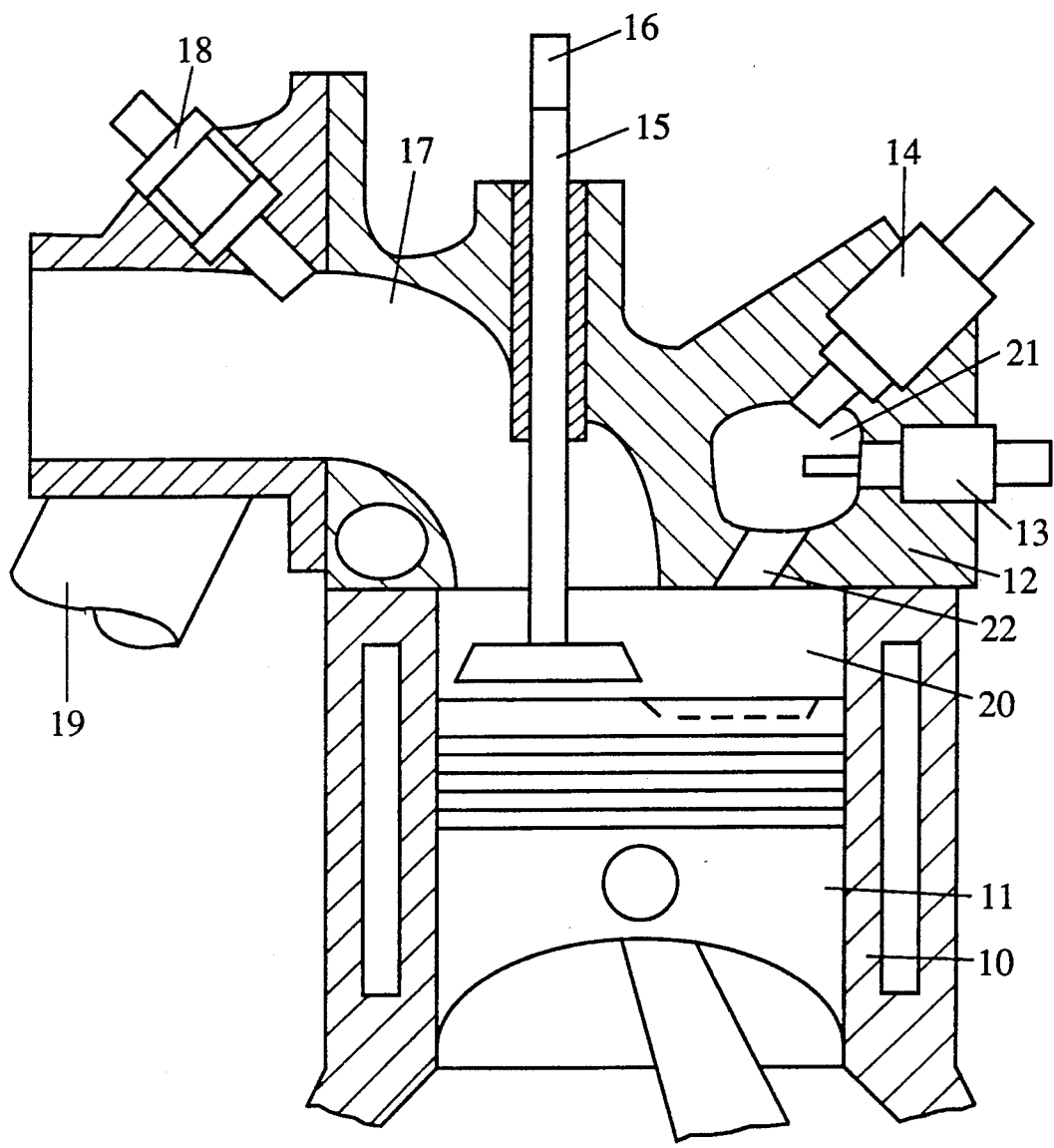
FIG. 1 is an assembly schematic section view of the engine of HYSCOM with the separate combustion chamber structure (the main combustion chamber and the prechamber).

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

The combustion chamber of HYSCOM has mainly two kinds of structures: a separate combustion chamber structure and a single region combustion chamber structure.

The separate combustion chamber structure consists of two regions: the main combustion chamber 20 and the prechamber 21, as illustrated in FIG. 1 to FIG. 4. The main combustion chamber 20 is mainly formed by the cylinder 10, the piston 11, the intake valve 15, the exhaust valve 16 and the cylinder head 12. The prechamber 21 is located in the cylinder head 12. The main combustion chamber 20 and the prechamber 21 are interconnected by one or more flame holes 22. HYSCOM has no throttle. Air charge flows through the intake manifold port 17 and passes by the intake valve 15 into the cylinder 10. The intake valve 15 is located in the main combustion chamber 20. The exhaust valve 16 is also located in the main combustion chamber 20. The exhaust manifold port 19 interconnects the exhaust valve 16 with the tailpipe of the engine. HYSCOM also has the glow plug 13 to aid cold start which is disposed in the prechamber 21 in the separate combustion chamber structure.

Figure 9:
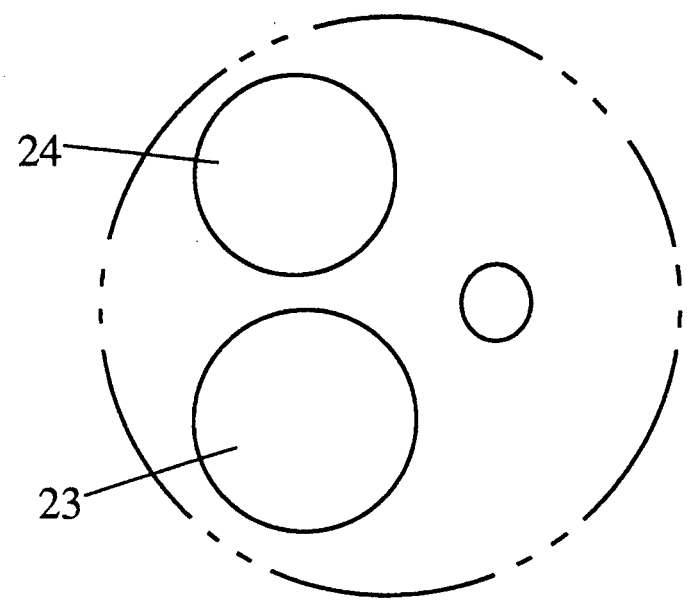
FIG. 9 is a schematic view of a portion of the cylinder head of the engine of HYSCOM in the single region combustion chamber structure showing the positions of the intake valve and the exhaust valve.
Figure 10:
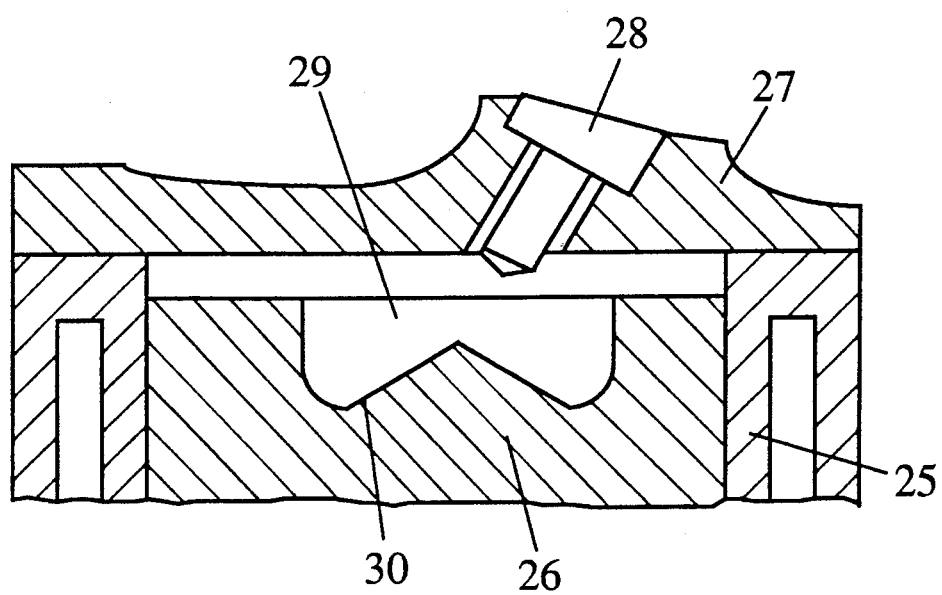
FIG. 10 is an assembly schematic section view of the combustion chamber of the engine of HYSCOM showing the comprising of the combustion chamber of the single region combustion chamber structure (the main combustion chamber).

The single region combustion chamber structure of HYSCOM is illustrated in FIG. 9 and FIG. 10. The main combustion chamber 29 is mainly formed by the cylinder 25, the piston 26, the cylinder head 27, the intake valve 23 and the exhaust valve 24. The important portion of the main combustion chamber is the cavity 30 in the piston head. The diesel injector 28 is disposed in the main combustion chamber 29 in the single region combustion chamber structure.

In the single region combustion chamber structure, the temperature and pressure near the end of the compression stroke are higher than those in the separate combustion chamber structure at a same compression ratio. Because there is no glow plug to aid cold start, be sure the compression ratio used makes the injected diesel ignite in the condition of cold start.

In the single combustion chamber structure, there is a cavity 30 of w (omega) shape in the piston head, as shown in FIG. 10. This cavity 30 makes air or premixed mixture of gasoline fuel and air mixing with injected diesel fuel complete by matching the motion of air or premixed mixture of gasoline fuel and air with injection of diesel fuel.

HYSCOM uses diesel and gasoline as fuels in operation and has two kinds of fuel supply equipment. Gasoline supply equipment includes a gasoline tank, a gasoline pump, gasoline conduits, an electronic injection control unit means and necessary sensors and the gasoline injector 18. But in the drawings only gasoline injector 18 is shown. Diesel supply equipment includes a diesel tank, a diesel pump, diesel conduits, high pressure diesel conduits, an electronic injection control unit means and necessary sensors, and the diesel injector. But only diesel injector 14 or injector 28 is shown in the drawings. The gasoline injector 18 is chosen to locate in the intake manifold port 17 as shown in FIG. 1. If the engine of HYSCOM is multi-cylinder engine, the gasoline injector(s) is either located in the main intake manifold to supply gasoline fuel to all cylinders by one gasoline injector, or are located in the intake manifold port to supply gasoline fuel to each cylinder by individual gasoline injectors. Gasoline supply equipment can use common fuel injection equipment of gasoline engines. The only thing to do is to change the control program to meet the requirements of HYSCOM. The diesel injector 14 is disposed in the prechamber 21 in the separate combustion chamber structure or the injector 28 is disposed in the main combustion chamber 29 in the single region combustion chamber structure. In multicylinder engines, each cylinder has a diesel injector.

HYSCOM has two combustion modes depending on the load of the engine. The load, so called, means at the same engine speed, how much power the engine outputs, in other words, how much fuel is needed by the engine. When the power output is zero, it is called idle running, when the power output is the largest at the engine speed, it is called full load running. Between idle and full load running, it is called part load running.

Figure 5:
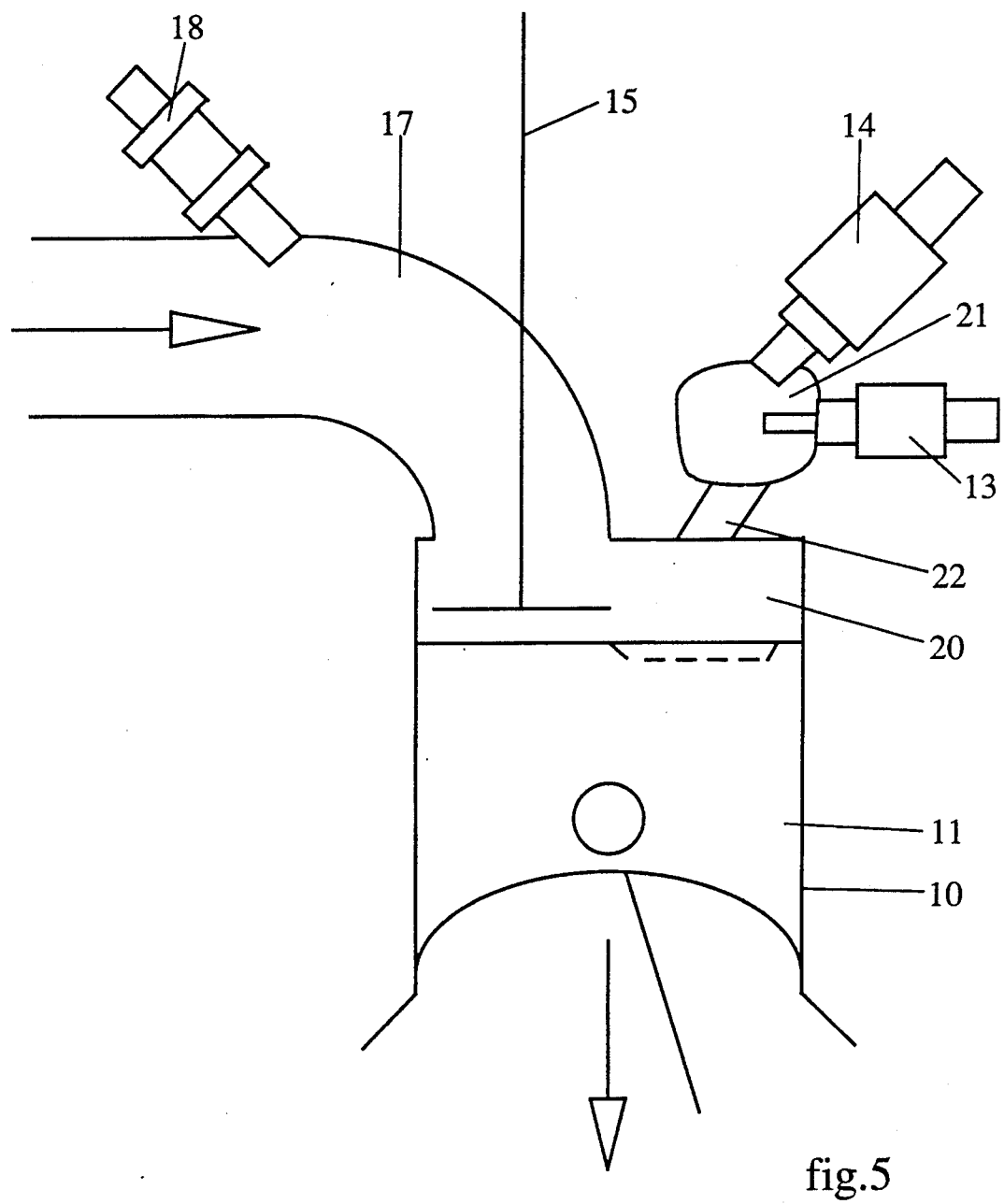
FIG. 5 is a schematic view of the intake stroke of the engine of HYSCOM showing how an air charge is supplied in single fuel combustion mode of HYSCOM.
Figure 6:
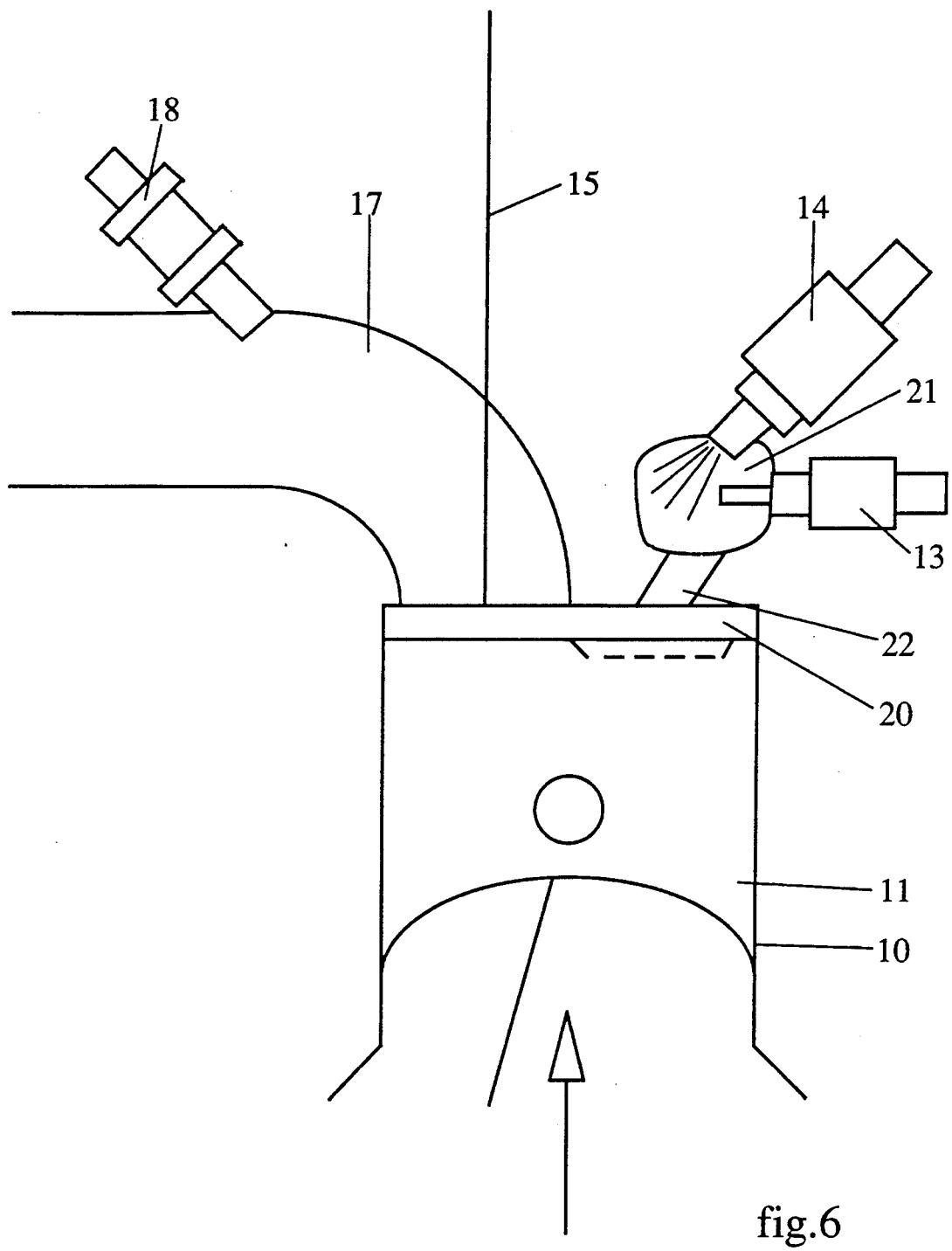
FIG. 6 is a schematic view of the compression stroke of the engine of HYSCOM showing how diesel fuel is supplied in single fuel combustion mode of HYSCOM.

Single fuel combustion mode:

When the engine of HYSCOM runs in idle or low load running condition, the combustion of the engine of HYSCOM employs single fuel combustion mode. As illustrated in FIG. 5, in the intake stroke, only air charge is introduced into the cylinder 10 of the engine. During the compression stroke, the air is forced through the flame holes 22 into the prechamber 21 under pressure. And near the end of compression stroke, the temperature and pressure of the air are high enough to immediately vaporize and ignite the incoming diesel fuel charge. At the time for injecting diesel fuel, the diesel injector 14 supplies diesel fuel into the prechamber 21 in the separate combustion chamber structure as illustrated in FIG. 6. Injected diesel fuel ignites in the prechamber 21. The flame with mixture and burned products rushes out of the prechamber 21 through the flame holes 22, then the combustion is completed in the main combustion chamber 20 and in the prechamber 21.

When the combustion chamber of HYSCOM is the single region combustion chamber structure, diesel fuel is injected into the main combustion chamber 29. Injected diesel fuel ignites, and then the combustion is completed in the main combustion chamber 29.

Dual fuel combustion mode:

When the engine of HYSCOM runs in large or full load running condition, the combustion of the engine of HYSCOM employs dual fuel combustion mode. In large or full load running condition, the engine needs more fuel than in idle or low load running condition. The more fuel there is, the more difficult it is to form a good mixture if only diesel fuel is used as in conventional diesel engines. The results of poor mixture are smoking and loss of efficiency that take place in conventional diesel engines.

Figure 7:
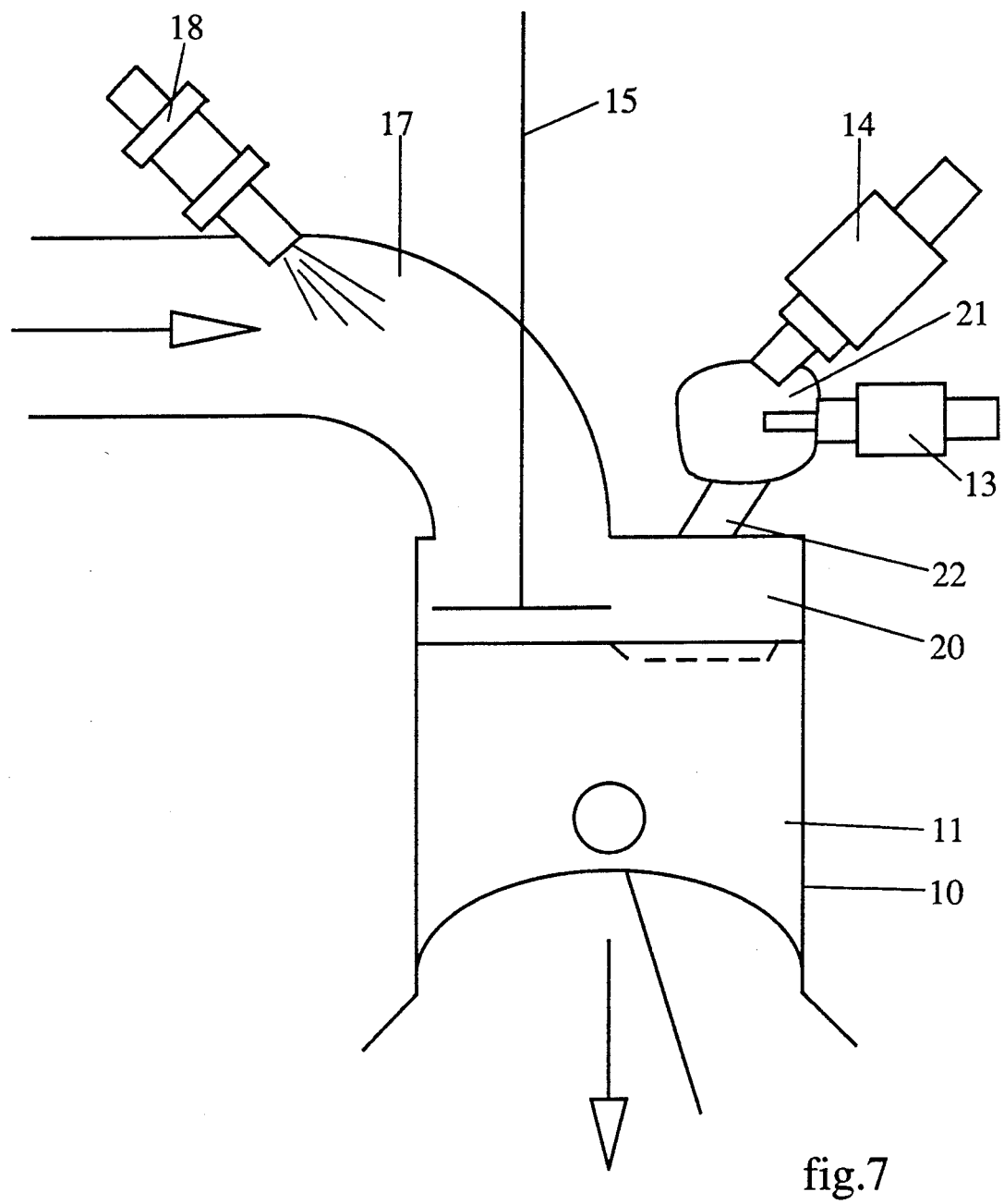
FIG. 7 is a schematic view of the intake stroke of the engine of HYSCOM showing how air charge and gasoline fuel are supplied in dual fuel combustion mode of HYSCOM.
Figure 8:
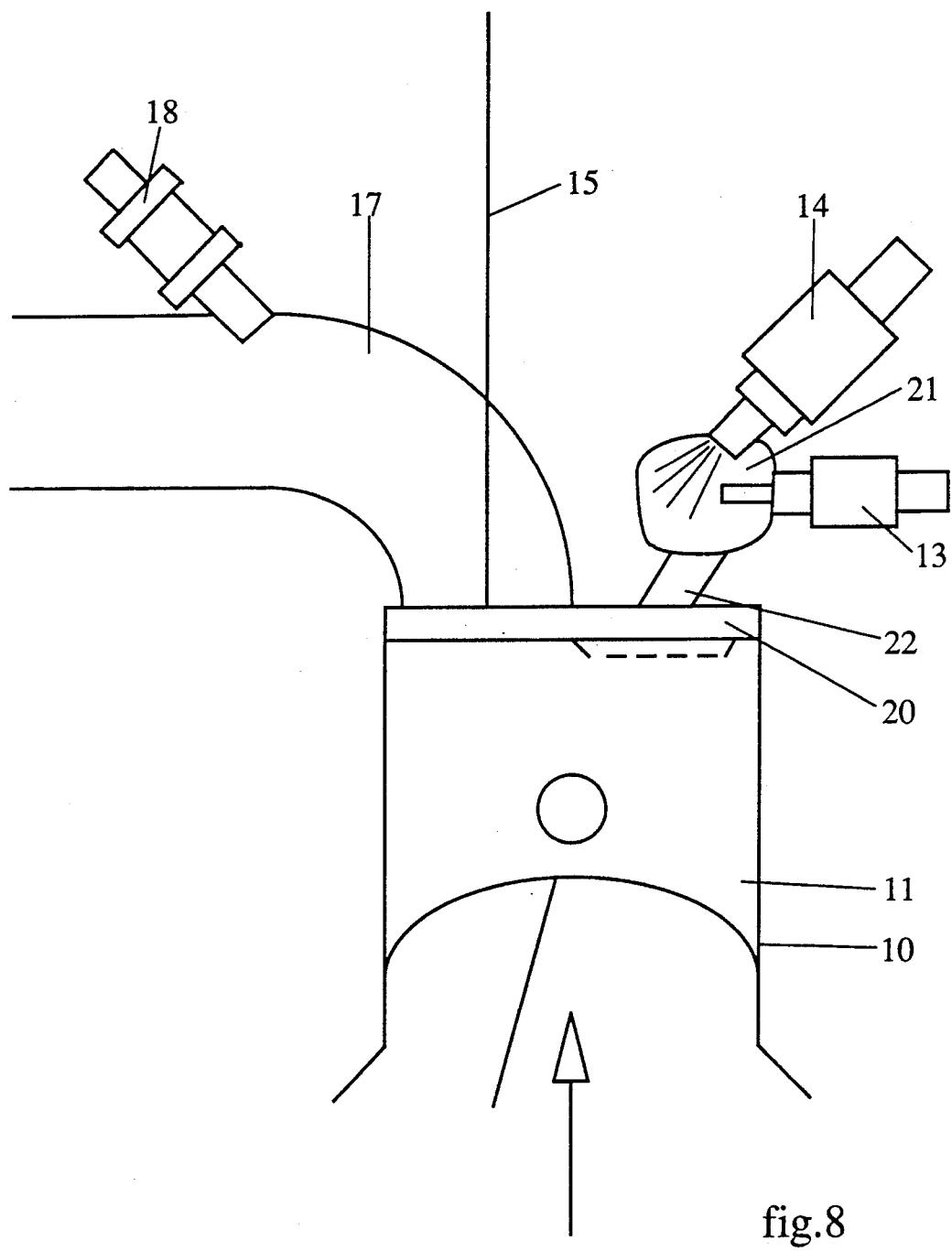
FIG. 8 is a schematic view of the compression stroke of the engine of HYSCOM showing how diesel fuel is supplied in dual fuel combustion mode of HYSCOM.

In large or full load running condition, the gasoline injector 18 supplies gasoline fuel into the air charge in the intake manifold port 17. The gasoline fuel vaporizes and mixes with the air charge and then is introduced into the cylinder in the intake stroke as illustrated in FIG. 7. The amount of gasoline fuel is the part of the total fuel needed in that running condition. When the intake stroke is completed, in the cylinder 10, there is lean premixed gasoline mixture which is not spontaneously combustible but can be ignited by the diesel flame. As the compression stroke continues, the temperature and pressure of the mixture get higher, and some mixture is forced into the prechamber 21 through the flame holes 22. At the time for injecting diesel fuel, the temperature and pressure of the mixture are high enough to make injected diesel fuel ignite immediately. At this time, diesel injector 14 supplies diesel fuel into the prechamber 21 in the separate combustion chamber structure as illustrated in FIG. 8. The amount of the diesel fuel is the part of the total fuel needed by the engine in that running condition. Injected diesel fuel undergoes physical and chemical changes and ignites. The burning diesel flame ignites the premixed gasoline mixture in the prechamber 21. Then the flame with some diesel mixture, gasoline mixture and burned products rushes out of the prechamber 21 through the flame holes 22. The premixed gasoline mixture in the main combustion chamber 20 is ignited by the incoming flame from the prechamber 21. Then the flame spreads through the main combustion chamber 20 until the combustion is completed in the prechamber 21 and in the main combustion chamber 20.

When the combustion chamber of HYSCOM is the single region combustion chamber structure, at the time for injecting diesel fuel, in the main combustion chamber 29, there is a lean premixed gasoline mixture which is not spontaneously combustible but can be ignited by the diesel fuel. Diesel injector 28 supplies diesel fuel into the main combustion chamber 29. Injected diesel fuel undergoes physical and chemical changes and ignites. The burning diesel flame ignites the premixed gasoline mixture in the main combustion chamber 29. Then the flame spreads through in the main combustion chamber 29 until the combustion is completed.

Interchange of single fuel combustion mode with dual fuel combustion mode is described as follows: In idle or low load running condition, the engine of HYSCOM employes single fuel combustion mode. Only diesel fuel is supplied into the combustion chamber. As the power output of the engine of HYSCOM increases, diesel fuel needed increases. When diesel supply increases to reach to the amount of fuel FC, the combustion mode of HYSCOM can change from single fuel combustion mode to dual fuel combustion mode.

In dual fuel combustion mode, FC consists of two parts: diesel fuel FD and gasoline fuel FG, FC=FD+FG (equivalent in calorie). The minimum amount of FC, FCmin should follow the condition:

$$FCmin = FDmin + FGmin$$

where FCmin means the minimum amount of fuel needed by the engine in that running condition when combustion mode changes from single fuel combustion mode to dual fuel combustion mode, FDmin is the minimum amount of diesel fuel that is large enough to ignite itself and has enough energy to ignite the premixed gasoline mixture, FGmin is the minimum amount of gasoline fuel whose mixture with air must be ignited by the flame of diesel fuel FDmin. Of course, FDmin and FGmin have some interchangeability. In fact, HYSCOM can choose the amount of fuel FC that is larger than FCmin when combustion mode changes from single fuel combustion mode to dual fuel combustion mode, depending on concerns about combustion speed, emissions, smoke, roughness, and vibration, etc. When the power output of the engine of HYSCOM decreases, fuel needed also decreases. When the fuel needed is equal to FC, the combustion mode of HYSCOM changes to single fuel combustion mode from dual fuel combustion mode. Here HYSCOM supposes the amount of fuel at the point of interchange of the two combustion modes is the same whether running in single fuel combustion mode or dual fuel combustion mode. In the reality, there is little difference of the amount of the fuels coming from the differences of heat transfer and combustion speed, etc.

In dual fuel combustion mode, the power output of the engine of HYSCOM can be regulated by either changing gasoline supply or by changing diesel supply or by both. In single fuel combustion mode, the power output of the engine of HYSCOM is regulated by changing diesel supply. In all running conditions, HYSCOM does not adjust air charge introduced into the cylinder. Therefore, HYSCOM does not have any throttle to adjust air charge.

The engine of HYSCOM can use a high compression ratio. When the engine of HYSCOM runs in single fuel combustion mode, the fuel supplied is only diesel fuel so that increasing compression ratio is not limited by detonation of gasoline fuel. When the engine of HYSCOM runs in dual fuel combustion mode, fuels supplied are gasoline fuel and diesel fuel. But in dual fuel combustion mode, gasoline mixture is ignited by the diesel flame. The diesel flame has much more energy than the spark plug of conventional gasoline engines, so that gasoline mixture can be very lean. And very lean gasoline mixture is not easy to detonate compared to rich gasoline mixture (near stoichiometric ratio). Because there is no detonation problem, the engine of HYSCOM can use high compression ratio to get high temperature and pressure of the mixture to make injected diesel fuel ignite. Another feature of HYSCOM is the octane number of gasoline fuel is not a sensitive factor, so that the engine of HYSCOM can use gasoline of low octane number and reduce running cost.

Another feature is the engine of HYSCOM can use lean mixture in the meaning of total air/total fuel. In single fuel combustion mode, diesel fuel supplied is much less than the total fuel needed in full load running condition, but air charge remains nearly the same in different load running conditions at the same engine speed as a result of HYSCOM does not use any throttle to adjust the intake charge. In fact, HYSCOM has similar air/fuel ratio range with diesel engines. But in full load running condition, HYSCOM has more flexibility than conventional diesel engines and gasoline engines to change the air/fuel ratio of the mixture, because HYSCOM's diesel supply is less than that conventional diesel engines need. Using premixed gasoline mixture and less diesel fuel make HYSCOM use air charge more efficiently than a conventional diesel engine. HYSCOM is a solution of diesel engine's smoke. As a result, HYSCOM can use any air/fuel ratio that the designer wants. If designer wants to control emissions (particularly NOx), he can choose large air/fuel ratio. If designer wants to increase power output of the engine, he can choose relatively small air/fuel ratio.

HYSCOM has two kinds of combustion: so called flame-spreading combustion and diffusing-combustion. Combining these two kinds of combustion is a better way to control combustion speed, so that HYSCOM has more flexibility available to adjust combustion speed by design in order to regulate power output and emissions of the engine. Although premixed gasoline mixture is much leaner than that of conventional gasoline engines, HYSCOM is easy to get fast-burning. In the separate combustion chamber structure, powerful swirl flame coming from the prechamber 21 can make the lean premixed gasoline mixture in the main combustion chamber 20 get into turbulence flame-spreading combustion. In the single region combustion chamber structure, diesel injector 28 can use some kind of multihole injector. Injected diesel fuel ignites itself at multiple points. Multiple points igniting reduces the distances through which the premixd gasoline flame spreads. And diesel flame also generates some turbulence in the main combustion chamber 29. As a result, the flame can spread through the premixed gasoline mixture quickly. HYSCOM reduces the amount of diesel compared with conventional diesel engines in the same running condition. The diesel injector can change the performance of supplying diesel fuel in order to reduce the amount of diesel fuel burned in the "fast-burning" period which can reduce the roughness and vibration of the engine compared with the conventional diesel engines. After ignition, the combustion of HYSCOM is in the manner of flame-spreading in the premixed gasoline mixture like conventional gasoline engines. Therefore, the engine of HYSCOM may run as smoothly and quietly as conventional gasoline engines.

While I have shown preferred embodiments, other embodiments may be devised incorporating the invention described above without departing from the spirit and scope of the following claims.

What is claimed is:

1. A hybrid step combustion system for an internal combustion engine having a gasoline supply means and a diesel supply means, said combustion system comprising:

a combustion chamber formed by a cylinder, a piston, at least one intake valve, at least one exhaust valve and a cylinder head in which combustion of a mixture of at least one fuel and air occurs;

an intake valve assembly disposed in said combustion chamber and interconnecting said combustion chamber with an intake manifold port;

an exhaust valve assembly disposed in said combustion chamber and interconnecting said combustion chamber with an exhaust manifold port;

said gasoline supply means supplying gasoline fuel into an intake air charge which is introduced into said combustion chamber; and said diesel supply means supplying diesel fuel into said combustion chamber, said gasoline supplying means and said diesel supply means selectively operable in a single fuel combustion mode or a dual fuel combustion mode.

2. A hybrid step combustion system as claimed in claim 1, wherein said combustion chamber has two regions, one of which is a main combustion chamber formed by a cylinder, a cylinder head and a cavity in the piston head and is filled with air in said single fuel combustion mode and filled with gasoline and air in said dual fuel combustion mode, the other one of which is a prechamber formed by a cavity in the cylinder head and having a diesel injector means disposed therein and filled with air and injected diesel fuel in said single fuel combustion mode and filled with gasoline and air and injected diesel fuel in said dual fuel combustion mode, at least one flame hole connecting the main combustion chamber and prechamber, said prechamber having a glow plug disposed therein to aid cold starting.

3. A hybrid step combustion system as claimed in claim 1, wherein said combustion chamber has a single region, the central portion of which is formed by a cavity in the piston head and in which a diesel injector means is disposed, and is filled with air and injected diesel fuel in said single fuel combustion mode and is filled with gasoline and air and injected diesel fuel in said duel fuel combustion mode.

4. A hybrid step combustion system as claimed in claim 1 including a gasoline injector means disposed in the intake manifold port and wherein said gasoline supply means supplies no gasoline in said single fuel combustion mode and supplies gasoline fuel mixed with an air charge in said dual fuel combustion mode, said gasoline supply means changing the amount of supplied gasoline fuel in combination with said diesel supply means changing the amount of supplied diesel fuel to regulate the power output of the engine.

5. A hybrid step combustion system as claimed in claim 2, wherein said diesel injector means supplies an adjustable amount of diesel fuel near the end of the compression stroke to the prechamber in said single fuel combustion mode for regulating the power output of the engine and changes the amount of diesel fuel in combination with said gasoline supply means changing the amount of supplied gasoline to regulate the power output of the engine in said dual fuel combustion mode.

6. A hybrid step combustion system as claimed in claim 3, wherein said diesel injector means is disposed near the central portion of the combustion chamber and supplies an adjustable amount of fuel near the end of the compression stroke to the combustion chamber in said single fuel combustion mode to regulate the power output of the engine and changes the amount of supplied diesel fuel in combination with said gasoline supply means changing the amount of supplied gasoline to regulate the power output of the engine in said dual fuel combination mode.

7. A hybrid step combustion system for an internal combustion engines having a single fuel combustion mode means and a dual fuel combustion mode means, said single fuel combustion mode means switching to said dual fuel combustion mode means when a critical amount of diesel fuel is fed to the engine during a single fuel combustion mode, the critical amount of supplied diesel fuel needed at that running condition being replaced by a small amount of diesel fuel and an amount of gasoline fuel, the diesel fuel flame igniting a mixture of gasoline and air to obtain optimal fuel economy and emissions, and returning to said single fuel combustion mode when fuel needed at the running condition is less than the critical amount.

8. A hybrid step combustion system as claimed in claim 7, wherein said single fuel combustion mode means supplies an amount of diesel fuel needed at the running condition near the end of the compression stroke into a prechamber and regulates the power output of the engine by changing the amount of supplied diesel fuel.

9. A hybrid step combustion system as claimed in claim 7, wherein said single fuel combustion mode means supplies an amount of diesel fuel needed at the running condition near the end of the compression stroke into a combustion chamber and regulates the power output of the engine by changing the amount of supplied diesel fuel.

10. A hybrid step combustion system as claimed in claim 7, wherein said dual fuel combustion mode means supplies gasoline fuel into air in an intake manifold port to form a mixture of gasoline fuel and air which is introduced into a cylinder during an intake stroke, supplies an amount of diesel fuel, whose flame has enough energy to ignite the mixture of gasoline and air, near the end of compression stroke into a prechamber and regulates the power output of the engine by changing the amount of supplied diesel fuel in combination with changing the amount of supplied gasoline fuel.

11. A hybrid step combustion system as claimed in claim 7, wherein said dual fuel combustion mode means supplies gasoline fuel into air in an intake manifold port to form a mixture of gasoline fuel and air which is introduced into a cylinder during an intake stroke, supplies an amount of diesel fuel, whose flame has enough energy to ignite the mixture of gasoline and air, near the end of compression stroke into a combustion chamber and regulates the power output of the engine by changing the amount of supplied diesel fuel in combination with changing the amount of supplied gasoline fuel.

* * * * *